(12) United States Patent
Dutta Choudhury et al.

(10) Patent No.: US 11,425,306 B2
(45) Date of Patent: Aug. 23, 2022

(54) ZOOM IN OR ZOOM OUT WITH SLOW-MOTION VIDEO CAPTURE

(71) Applicant: QUALCOMM Incorporated, San Diego, CA (US)

(72) Inventors: Shubhobrata Dutta Choudhury, New Delhi (IN); Sai Krishna Bodapati, Vijaywada (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/156,219

(22) Filed: Jan. 22, 2021

(65) Prior Publication Data
US 2022/0239837 A1    Jul. 28, 2022

(51) Int. Cl.
| | |
|---|---|
| *H04N 5/232* | (2006.01) |
| *H04N 9/73* | (2006.01) |
| *H04N 5/235* | (2006.01) |
| *H04N 5/783* | (2006.01) |

(52) U.S. Cl.
CPC ....... *H04N 5/23296* (2013.01); *H04N 5/2353* (2013.01); *H04N 5/783* (2013.01); *H04N 9/73* (2013.01)

(58) Field of Classification Search
CPC ................................................. H04N 5/23296
USPC ......................................... 348/240.99–240.3
See application file for complete search history.

(56) References Cited

U.S. PATENT DOCUMENTS

| | | | |
|---|---|---|---|
| 7,940,324 B2 | 5/2011 | Hibino et al. | |
| 8,264,573 B2 * | 9/2012 | Suzuki | H04N 5/23296 348/240.99 |
| 2010/0060752 A1 * | 3/2010 | Tokuyama | G07F 17/3211 348/240.3 |
| 2013/0114938 A1 * | 5/2013 | Kuriyama | H04N 5/23296 386/225 |
| 2013/0343732 A1 | 12/2013 | Suzuki | |
| 2018/0070009 A1 | 3/2018 | Baek et al. | |

FOREIGN PATENT DOCUMENTS

| | | |
|---|---|---|
| JP | 4810323 B2 | 11/2011 |
| JP | 2017079437 A | 4/2017 |

OTHER PUBLICATIONS

International Search Report and Written Opinion of International Application No. PCT/US2022/012333, dated Apr. 5, 2022, 10 pp.

\* cited by examiner

*Primary Examiner* — Anthony J Daniels
(74) *Attorney, Agent, or Firm* — Shumaker & Sieffert, P.A.

(57) ABSTRACT

Aspect for a device for generating video content are described. The device includes a first camera and one or more processors coupled to the first camera and configured to receive a first set of frames captured by the first camera at a first rate, process the first set of frames to generate video content for display, receive a selection to zoom in or zoom out, during the zoom in or zoom out to a zoom threshold for the first camera, receive a second set of frames captured by the first camera at a second rate that is less than the first rate, process the second set of frames to generate video content for display, and generate video content for playback, at a third rate that is less than the first rate, that includes the first set of frames and the second set of frames.

26 Claims, 5 Drawing Sheets

ZOOM IN OR ZOOM OUT WITH SLOW-MOTION VIDEO CAPTURE

TECHNICAL FIELD

This disclosure relates to image processing.

BACKGROUND

A camera device includes one or more cameras that capture frames (e.g., images). Examples of the camera device include stand-alone digital cameras or digital video camcorders, camera-equipped wireless communication device handsets, such as mobile telephones having one or more cameras, cellular or satellite radio telephones, camera-equipped personal digital assistants (PDAs), panels or tablets, gaming devices, computer devices that include cameras, such as so-called "web-cams," or any device with digital imaging or video capabilities.

The camera device processes the captured frames and outputs the frames for display. In some examples, the camera device captures frames at a first rate and displays the frames at a second rate that is less than the first rate. The result of displaying the frames at the second rate that is less than the first rate at which the frames are captured is that the image content appears to move in slow motion.

SUMMARY

In general, this disclosure describes techniques for slow motion video capture with zoom in or zoom out capabilities in multi-camera devices. Each of the cameras on a camera device may be associated with zoom factor ranges between respective zoom thresholds. For example, a zoom factor for a first camera may be between 0.5× to 1× magnification of captured image content. In this example, the zoom factor range is from 0.5× magnification to 1× magnification, a first zoom threshold is 0.5×, and a second zoom threshold is 1×. Other cameras of the device may have other zoom factor ranges (e.g., from 1× to 2× magnification, and the like). Also, each of the cameras may be configured to capture frames in accordance with respective camera parameters. For zooming in (e.g., increasing magnification) or zooming out (e.g., decreasing magnification), a camera processor processes frames captured by a first camera based on the camera parameters for the first camera until a zoom threshold for the first camera is reached, at which point, the camera processor processes frames captured by a second camera (e.g., the camera processor switches from a wide angle camera to a telephoto camera).

In one or more examples, during the zooming in or out (e.g., during the time when frames captured by the first camera are zoomed into or out of from a current zoom factor to a zoom threshold), the first camera may be configured to capture frames at a lower frame rate than the rate at which the first camera may capture frames when not zooming in or out. As described in more detail, by reducing the capture rate during the zooming in or out, the example techniques may reduce the number of poor-quality frames that are captured by the first camera and displayed before frames captured by a second camera are displayed.

For instance, in slow motion, the captured frames are displayed at a lower rate than a rate at which the frames are captured. Also, during the zooming in or out, the camera parameters may not be optimized, resulting in poorer image quality of the frames that are captured during the time of zooming in or zooming out from a current zoom factor to a zoom threshold. In slow motion, if there are many frames with poor image quality, the viewer experience is negatively impacted. By reducing the number of poor-quality frames that are captured and then displayed, the example techniques may improve the overall operation of the camera device such that the resulting device can provide zooming in or out capabilities even when slow-motion video capture is enabled.

In one example, the disclosure describes a device for generating video content, the device comprising a first camera and one or more processors coupled to the first camera and configured to receive a first set of frames captured by the first camera at a first rate, process the first set of frames to generate video content for display, receive a selection to zoom in or zoom out, during the zoom in or zoom out to a zoom threshold for the first camera, receive a second set of frames captured by the first camera at a second rate that is less than the first rate, process the second set of frames to generate video content for display, and generate video content for playback, at a third rate that is less than the first rate, that includes the first set of frames and the second set of frames.

In one example, the disclosure describes a method for generating video content, the method comprising receiving, with one or more processors, a first set of frames captured by a first camera at a first rate, processing, with the one or more processors, the first set of frames to generate video content for display, receiving, with the one or more processors, a selection to zoom in or zoom out, during the zoom in or zoom out to a zoom threshold for the first camera, receiving, with the one or more processors, a second set of frames captured by the first camera at a second rate that is less than the first rate, processing, with the one or more processors, the second set of frames to generate video content for display, and generating, with the one or more processors, video content for playback, at a third rate that is less than the first rate, that includes the first set of frames and the second set of frames.

In one example, the disclosure describes a computer-readable storage medium storing instructions thereon that when executed cause one or more processors to receive a first set of frames captured by a first camera at a first rate, process the first set of frames to generate video content for display, receive a selection to zoom in or zoom out, during the zoom in or zoom out to a zoom threshold for the first camera, receive a second set of frames captured by the first camera at a second rate that is less than the first rate, process the second set of frames to generate video content for display, and generate video content for playback, at a third rate that is less than the first rate, that includes the first set of frames and the second set of frames.

In one example, the disclosure describes a device for generating video content, the device comprising means for receiving a first set of frames captured by a first camera at a first rate, means for processing the first set of frames to generate video content for display, means for receiving a selection to zoom in or zoom out, means for receiving a second set of frames captured by the first camera at a second rate that is less than the first rate during the zoom in or zoom out to a zoom threshold for the first camera, means for processing the second set of frames to generate video content for display, and means for generating video content for playback, at a third rate that is less than the first rate, that includes the first set of frames and the second set of frames.

The details of one or more examples are set forth in the accompanying drawings and the description below. Other features, objects, and advantages will be apparent from the description, drawings, and claims.

DETAILED DESCRIPTION

Figure 1:
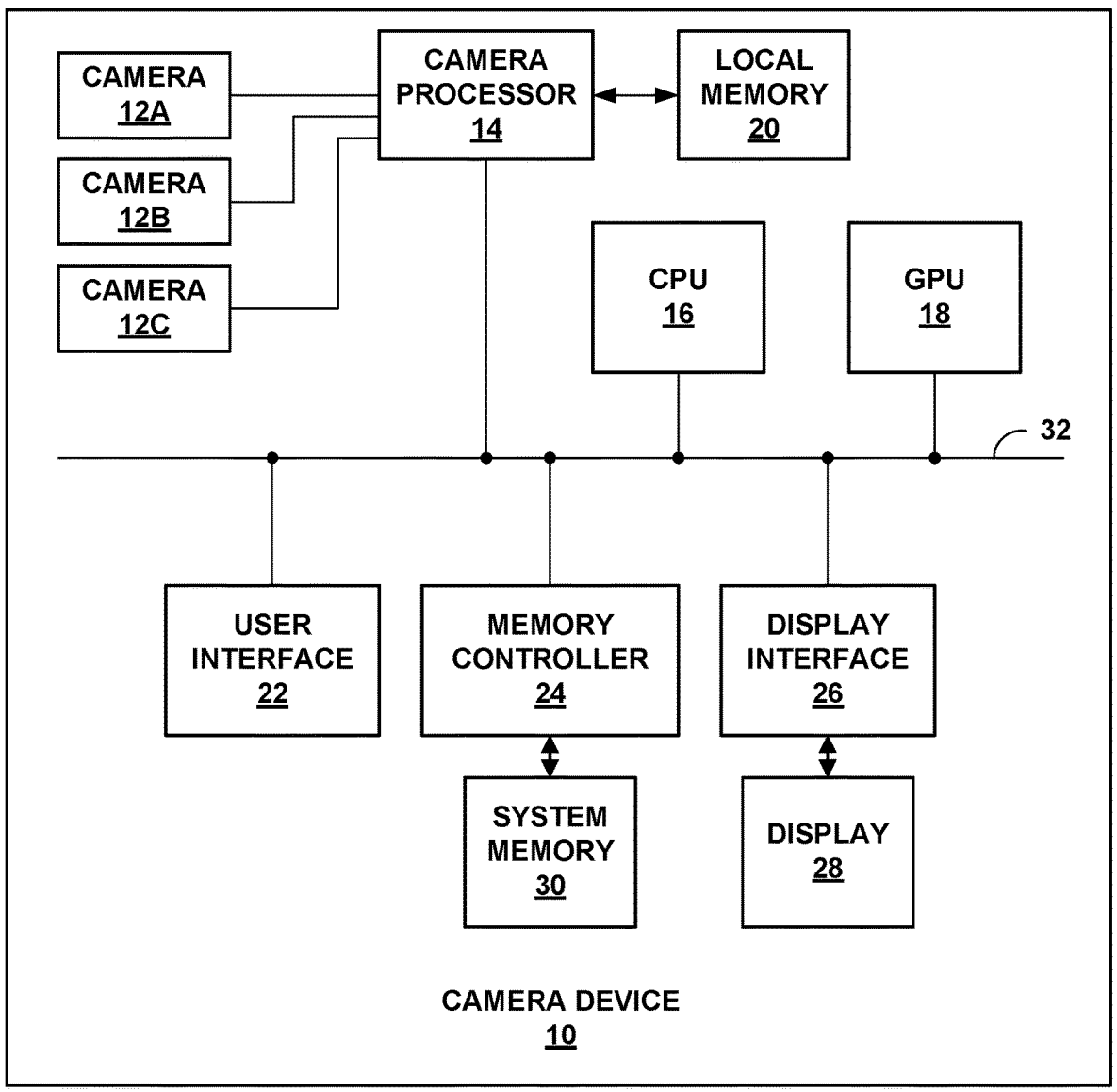
FIG. 1 is a block diagram of a device configured to perform one or more of the example techniques described in this disclosure.

The example techniques described in this disclosure relate to slow motion video capture with zoom in or zoom out capabilities in multi-camera devices. A camera device may include multiple cameras to support zooming in or zooming out of video content. For example, a camera device may include an ultra-wide camera (e.g., configured to capture more than 120° of viewing angle, such as 120° to 180°), a wide camera (e.g., configured to capture greater than 60° of viewing angle, such as 60° to) 120°, and a telephoto camera (e.g., configured to capture less than 60° of viewing angle, such as 10° to 60°). Each of the multiple cameras may be associated with respective zoom factor ranges and zoom thresholds. For example, the ultra-wide camera may provide a zoom factor range of 0.5× to 1×, where 0.5× and 1× are zoom thresholds. The wide camera may provide a zoom factor range of 1× to 2×, where 1× and 2× are zoom thresholds. The telephoto camera may provide a zoom factor of greater than 2×, where 2× is a zoom threshold. The zoom factors of 0.5×, 1×, and 2× may refer to the reproduction ratio of an object on a sensor of the respective cameras (e.g., for a 0.5× zoom factor for the ultra-wide camera, a half-inch object would reproduce as 0.25 of the size of the object on the sensor of the ultra-wide camera).

Each camera may be associated with respective zoom factors based on the optical zoom and/or digital zoom capabilities. That is, each camera may provide the zooming in or out over the zoom factor range based on one or combination of optical zoom and digital zoom. Examples of optical zoom and digital zoom are described below.

In the above example, there is no overlap in the zoom factor ranges for each of the cameras. However, in some examples, there may be overlap in the zoom factor ranges. For example, the zoom factor range for the ultra-wide camera may be 0.5× to 1.3×, the zoom factor range for the wide camera may be 1× to 2.3×, and the zoom factor range for the telephoto camera may be greater than 2×. In this example, the zoom threshold for the ultra-wide camera is 0.5× and 1.3×, the zoom threshold for the wide camera is 1× and 2.3×, and the zoom threshold for the telephoto camera is 2×.

The zoom factor ranges and zoom thresholds are provided merely as examples and should not be considered limiting. The example techniques described in this disclosure are not limited to any particular zoom factor ranges or zoom thresholds.

In some examples, when zooming in or zooming out, there is hand-off between different cameras as respective zoom thresholds are reached. For example, a user of the camera device may initially capture video content using the ultra-wide camera with zoom factor of 0.5×, and a camera processor of the camera device may process the frames captured by the ultra-wide camera. The user may then zoom in (e.g., using a button or pinch motion). In this example, during the zooming in, the camera processor may process the frames captured by the ultra-wide camera until the zoom threshold of the ultra-wide camera is reached (e.g., 1×). The camera processor may then process the frames captured by the wide camera.

One example way in which to maintain quality of the captured video content is for each camera to determine, prior to video capture, respective camera parameters. Examples of the camera parameters include 3 A parameters (automatic focus (AF), auto white balance (AWB), and automatic exposure control (AEC) parameters), as described in more detail. Even if a camera processor is not processing frames from a particular camera, the camera parameters are already known. Then, when the camera processor is to switch processing frames from a current camera to a subsequent camera, there is no delay in determining the camera parameters for the subsequent camera, since the camera parameters for the subsequent camera were pre-determined. In this way, the hand off (e.g., switch in processing frames) from the current camera to the subsequent camera can occur with limited impact on quality and limited delay.

In addition to camera devices including multiple cameras to support zooming in or zooming out, camera devices also provide an option for slow motion video capture. In slow motion video capture, a camera of a camera device captures frames at a first rate that is greater than a second rate at which the captured frames are displayed. As an example, a camera may capture 10 seconds of video content at a capture rate of 120 frames per second (fps). In this example, there are 1200 frames (e.g., 120 fps*10 seconds). The camera device, or some other device, may display the 1200 frames at a display rate of 30 fps. In this example, the 1200 frames would be displayed over 40 seconds (e.g., 1200 frames/30 fps). Therefore, in this example, the 10 seconds of video content is displayed over 40 seconds, and the viewer perceives the video content as being in slow motion (e.g., rate of movement of objects in the video content is slower than the rate at which the objects move in real-life).

There may be technical difficulties in enabling zooming in or zooming out with slow motion video capture enabled. For example, in response to request to zoom in or zoom out, the camera processor performs digital zoom in or zoom out on the frames captured by the current camera until the zoom threshold is reached. As an example, the current camera may be the ultra-wide camera, and in response to zoom in, the camera processor may perform digital zoom in on the frames capture by the current camera until the zoom threshold of 1× is reached.

Digital zoom in or zoom out includes cropping and resizing of frames during a linear increase or decrease of a zoom factor. For instance, the camera processor may receive frames from the ultra-wide camera, and to perform 0.6× zoom, the camera processor may crop 10% of the perimeter of the frame, and resize the result of the cropping, and so forth. The camera processor may perform the digital zoom in or zoom out by increasing the zoom factor, over a period of time, until the zoom threshold is reached (e.g., 0.6×, 0.7×, 0.8×, 0.9×, until 1×). The example is described with respect to the ultra-wide camera, but the example techniques of zooming in or zooming out may be similar for the other cameras.

In some examples, the digital zoom in or out causes a decrease in image quality due to the resizing. For example, the camera parameters may not be precise for the frames that are captured during the time when the camera processor is performing the zooming in or zooming out. For example, the camera parameters may be set based on a particular zoom factor (e.g., 0.5× for ultra-wide, 1× for wide, and 2× for telephoto cameras). During the zooming in or zooming out, the captured frames may be effectively considered as frames captured with different video content as compared to the video content without zooming in or zooming out. The camera parameters, such as automatic focus (AF), auto white balance (AWB), and automatic exposure control (AEC) parameters, determined for the particular zoom factor may not be precise for frames captured with different video content, where frames captured during the zooming in or zooming out effectively have different video content.

The above describes examples of digital zoom. However, similar issues of decrease in image quality for capturing using optical zoom. In optical zoom, a lens and/or sensor of the camera moves to provide zooming in or zooming out. The camera parameters may be set for the lens or sensor in a particular location, and movement of the lens or sensor may result in the camera parameters being imprecise.

After a zoom threshold for a current camera is reached, the camera processor outputs frames captured by the subsequent camera. In this case, the frames captured by the subsequent camera are captured with the already determined camera parameters for the subsequent camera. Accordingly, the image quality is relatively high for the frames captured by the subsequent camera. The above example process of generating frames with lower image quality then repeats if there is another request for zoom in or zoom out with the subsequent camera.

As described above, in slow motion video capture, the rate at which frames are captured is greater than the rate at which frames are displayed, so as to cause a slow-motion affect. As also described, during zooming in or zooming out, the image quality of the captured frames may be relatively low. In some examples, because these frames having lower image quality are displayed over a longer amount of time than the amount of time for capturing, there may be an undesirably long period of time where low quality frames are displayed. For example, the current camera may be capturing frames at 120 fps, and the amount of time to zoom in or out to a zoom threshold may be 0.5 seconds. In this example, during the zooming in or out, the current camera may capture 60 frames (e.g., 120 fps*0.5 seconds), and the image quality of the 60 frames may be poorer than without zooming in or out. The display rate may be 30 fps. Therefore, the 60 frames may be displayed over 2 seconds (e.g., 60 frames/30 fps). In this example, although there may be only 0.5 seconds worth of poor-quality frames, it may take 2 seconds to display the poor-quality frames, which may be undesirable to a viewer.

In accordance with one or more examples described in this disclosure, during normal operation (e.g., without zoom in or zoom out) with slow motion enabled, a camera may capture a first set of frames at a first rate (e.g., 120 fps or greater), and during zoom in or zoom out with slow motion enabled, the camera may capture a second set of frames at a second rate (e.g., 30 fps or less) that is lower than the first rate. The image quality of the second set of frames may be poorer than the image quality of the first set of frames.

The camera device or some other device may display the first set for frames and the second set of frames at a third rate (e.g., 30 fps). In this example, if 9.5 seconds of video content is captured by the first set of frames, and 0.5 seconds of video content is captured by the second set of frames, then there are 1,140 frames (e.g., 9.5 seconds*120 fps) with relatively high quality of image content and 15 frames (e.g., 0.5 seconds*30 fps) with relatively low quality of image content. Then, during display, there would be 38 seconds of playback of frames with relatively high quality of image content (e.g., 9.5 seconds of video content is expanded to 38 seconds to create slow motion effect). Also, there would be 0.5 seconds of playback of frames with relatively low quality of image content (e.g., 0.5 seconds of video content is displayed within 0.5 seconds). Because the amount of time that the frames having relatively low quality image content is reduced down to 0.5 seconds from 2 seconds if the capture rate would have been 120 fps, there may be little to no impact on viewer experience.

FIG. 1 is a block diagram of a device configured to perform one or more of the example techniques described in this disclosure. Examples of camera device 10 include stand-alone digital cameras or digital video camcorders, camera-equipped wireless communication device handsets, such as mobile telephones having a plurality of cameras, cellular or satellite radio telephones, camera-equipped personal digital assistants (PDAs), panels or tablets, gaming devices, computer devices that include cameras, such as so-called "web-cams," or any device with digital imaging or video capabilities.

As illustrated in the example of FIG. 1, camera device 10 includes cameras 12A-12C (e.g., each having an image sensor and lens), camera processor 14 and local memory 20 of camera processor 14, a central processing unit (CPU) 16, a graphical processing unit (GPU) 18, user interface 22, memory controller 24 that provides access to system memory 30, and display interface 26 that outputs signals that cause graphical data to be displayed on display 28. Although the example of FIG. 1 illustrates one camera processor 14, in some examples, there may be a plurality of camera processors (e.g., one for each of cameras 12A-12C). Techniques described in this disclosure with respect to camera processor 14 may include examples where one or more camera processors perform the example techniques.

Also, although the various components are illustrated as separate components, in some examples the components may be combined to form a system on chip (SoC). As an example, camera processor 14, CPU 16, GPU 18, and display interface 26 may be formed on a common integrated circuit (IC) chip. In some examples, one or more of camera processor 14, CPU 16, GPU 18, and display interface 26 may be in separate IC chips. Various other permutations and combinations are possible, and the techniques should not be considered limited to the example illustrated in FIG. 1.

The various components illustrated in FIG. 1 (whether formed on one device or different devices) may be formed as at least one of fixed-function or programmable circuitry such as in one or more microprocessors, application specific integrated circuits (ASICs), field programmable gate arrays (FPGAs), digital signal processors (DSPs), or other equivalent integrated or discrete logic circuitry. Examples of local memory 20 and system memory 30 include one or more volatile or non-volatile memories or storage devices, such as random access memory (RAM), static RAM (SRAM), dynamic RAM (DRAM), erasable programmable ROM (EPROM), electrically erasable programmable ROM (EEPROM), flash memory, a magnetic data media or an optical storage media.

The various units illustrated in FIG. 1 communicate with each other using bus 32. Bus 32 may be any of a variety of bus structures, such as a third generation bus (e.g., a Hyper-Transport bus or an InfiniBand bus), a second generation bus (e.g., an Advanced Graphics Port bus, a Peripheral Component Interconnect (PCI) Express bus, or an Advanced eXtensible Interface (AXI) bus) or another type of bus or device interconnect. The specific configuration of buses and communication interfaces between the different components shown in FIG. 1 is merely exemplary, and other configurations of camera devices and/or other image processing systems with the same or different components may be used to implement the techniques of this disclosure.

Camera device 10 includes cameras 12A-12C. Each one of cameras 12A-12C may be configured to capture frames having image content in accordance with respective camera parameters, as described below. Cameras 12A-12C may output their captured frames to camera processor 14 for image processing. As described in more detail below, in one or more examples, camera processor 14 may control the rate at which cameras 12A-12C capture frames, such as during zooming in or zooming out, to reduce the number of frames, having relatively poorer quality, that are displayed.

Camera processor 14 outputs the resulting frames with image content (e.g., pixel values for each of the image pixels) to system memory 30 via memory controller 24. That is, camera processor 14 may generate video content for playback that includes the resulting frames. In one or more examples described in this disclosure, the frames may be further processed for generating one or more frames for display. In some examples, rather than camera processor 14 performing the blending, GPU 18 or some other circuitry of camera device 10 may be configured to perform the blending.

This disclosure describes the examples techniques as being performed by camera processor 14. However, the example techniques should not be considered limited to camera processor 14 performing the example techniques. For instance, camera processor 14 in combination with CPU 16, GPU 18, and/or display interface 26 may be configured to perform the example techniques described in this disclosure. In some examples, each of cameras 12A-12C may include processing circuitry. Accordingly, the examples of the processor that may be perform the example techniques include processing circuitry that is part of cameras 12A-12C. For example, one or more processors may be configured to perform the example techniques described in this disclosure. Examples of the one or more processors include camera processor 14, CPU 16, GPU 18, display interface 26, processing circuitry of one or more of cameras 12A-12C, or any combination of one or more of camera processor 14, CPU 16, GPU 18, display interface 26, and processing circuitry of one or more of cameras 12A-12C.

CPU 16 may comprise a general-purpose or a special-purpose processor that controls operation of camera device 10. A user may provide input to camera device 10 to cause CPU 16 to execute one or more software applications. The software applications that execute on CPU 16 may include, for example, a media player application, a video game application, a graphical user interface application or another program. The user may provide input to camera device 10 via one or more input devices (not shown) such as a keyboard, a mouse, a microphone, a touch pad or another input device that is coupled to camera device 10 via user interface 22.

One example of the software application is a camera application. CPU 16 executes the camera application, and in response, the camera application causes CPU 16 to generate content that display 28 outputs. GPU 18 may be configured to process the content generated by CPU 16 for rendering on display 28. For instance, display 28 may output information such as light intensity, whether flash is enabled, and other such information. The user of camera device 10 may interface with display 28 to configure the manner in which the images are generated (e.g., with or without flash, focus settings, exposure settings, and other parameters). As one example, the user of camera device 10 may select to take multiple frames (e.g., multiple pictures), where two or more of the multiple frames are blended together (e.g., to reduce blur) to generate one or more output frames. However, taking multiple frames that are blended together may be the default option (e.g., no user selection is needed). The camera application also causes CPU 16 to instruct camera processor 14 to capture and process the frames of image content captured by camera 12 in the user-defined manner.

Memory controller 24 facilitates the transfer of data going into and out of system memory 30. For example, memory controller 24 may receive memory read and write commands, and service such commands with respect to memory 30 in order to provide memory services for the components in camera device 10. Memory controller 24 is communicatively coupled to system memory 30. Although memory controller 24 is illustrated in the example of camera device 10 of FIG. 1 as being a processing circuit that is separate from both CPU 16 and system memory 30, in other examples, some or all of the functionality of memory controller 24 may be implemented on one or both of CPU 16 and system memory 30.

System memory 30 may store program modules and/or instructions and/or data that are accessible by camera processor 14, CPU 16, and GPU 18. For example, system memory 30 may store user applications (e.g., instructions for the camera application), resulting frames from camera processor 14, etc. System memory 30 may additionally store information for use by and/or generated by other components of camera device 10. For example, system memory 30 may act as a device memory for camera processor 14.

As illustrated, camera device 10 includes cameras 12A-12C. Each of cameras 12A-12C may be configured with different zoom factors and may capture different amounts of viewing angles. In some examples, each of cameras 12A-12C may be configured with different lens geometries and different levels of optical zoom (e.g., different zoom factor ranges based on how much lenses or sensors of cameras 12A-12C can move). The viewing angles may be the field of view (FOV). In some examples, cameras 12A-12C with the same zoom factor may be capturing the same FOV.

Camera 12A may be an ultra-wide camera (e.g., configured to capture 120° to 180° of viewing angle), camera 12B may be a wide camera (e.g., configured to capture 60° to 120° of viewing angle), and camera 12C may be a telephoto camera (e.g., configured to capture 10° to 60° of viewing angle). Camera 12A may be configured to provide a zoom factor from a first zoom threshold of 0.5× to a second zoom threshold of 1×. Camera 12B may be configured to provide a zoom factor from a third zoom threshold of 1× to a fourth zoom threshold of 2×. Camera 12C may be configured to provide a zoom factor greater than a fifth zoom threshold of 2×.

In the above examples, the second zoom threshold and the third zoom threshold are the same, and the fourth zoom threshold and the fifth zoom threshold are the same. However, the techniques are not so limited. In some examples, there may be overlap in the zoom factor ranges of cameras 12A-12C. For instance, the second zoom threshold for camera 12A may be 1.3× and the third zoom threshold for camera 12B may be 1×. In this example, from 1× to 1.3× zoom, both cameras 12A and 12B can provide such zoom factors.

The examples of the number of cameras 12 on camera device 10, the viewing angles, and the zoom factor ranges and zoom thresholds are provided merely to assist with understanding. The example techniques should not be considered limited to such examples. There may be more or fewer cameras 12, the viewing angles may be different, and the zoom factor ranges and thresholds may be different.

The zoom factor ranges associated with each of cameras 12A-12C need not necessarily mean that sensors or lenses of cameras 12A-12C move to provide the desired zoom, although that this possible. That is, optical zoom is one way to provide zoom, but the techniques are not limited to optical zoom. In some examples, the zoom factor ranges associated with cameras 12A-12C may indicate from which camera of cameras 12A-12C camera processor 14 is to receive frames for performing digital zoom in or zoom out. Therefore, cameras 12A-12C being configured for particular zoom factor ranges may include examples where sensors or lenses of cameras 12A-12C are moving to provide optical zoom in or zoom out and/or from where camera processor 14 receives frames for performing digital zoom in or zoom out.

Camera processor 14 is configured to receive image frames from cameras 12A-12C, and process the image frames to generate output frames for display (e.g., generate video content for playback). CPU 16, GPU 18, camera processor 14, or some other circuitry may be configured to process the output frame that includes image content generated by camera processor 14 into images for display on display 28. In some examples, GPU 18 may be further configured to render graphics content on display 28.

Cameras 12A-12C may be configured to capture frames in accordance with their respective camera parameters that camera processor 14 and/or CPU 16 may determine. For instance, prior to the user of camera device 10 capturing frames, cameras 12A-12C may determine camera parameters referred to as 3 A parameters (automatic focus (AF), auto white balance (AWB), and automatic exposure control (AEC) parameters).

For automatic focus, CPU 16 may determine an area of the image on which to focus so that that the image content in the focused areas is in focus. Other areas may be in focus, but not necessarily in focus, depending on aperture size of cameras 12A-12C. As one example, CPU 16 may utilize phase detection autofocus (PDAF) techniques. CPU 16 may then control cameras 12A-12C (e.g., such as adjust focal length by adjusting location of the lens of cameras 12A-12C) based on area to focus. In some examples, CPU 16 may determine objects that are in the foreground and may control cameras 12A-12C to focus on the foreground objects. As another example, CPU 16 may utilize object detection techniques, like face detection, to determine area to focus.

For auto exposure control, CPU 16 may determine the aperture and shutter speed of cameras 12A-12C based on factors such as external lighting conditions. As one example, camera processor 14 may determine information indicative of light, and adjust the aperture and shutter speed accordingly to keep brightness of the image constant (e.g., keep the brightness of a desired region of a frame in the middle band of brightness values). For example, if there is too much light (i.e., overexposed), then details in the images may be lost, and if there is too little light (i.e., underexposed), then the image may be too dark and details may not be visible. There are various ways in which exposure is controlled, using "metering" such as center-weighted metering map where brightness at the center of the image is kept higher and progressively lowered near the edges of the image. In some examples, center-weighted metering ensures that the center of the image has values within a middle range of the brightness levels possible (i.e., the mid-tone). The outer areas may be brighter, darker or the same depending on the actual content of the scene being captured. The techniques described in this disclosure are not limited to examples of center-weighted metering maps (e.g., not limited to metering maps that are biased toward exposure control for a middle of the image).

For auto white balance, CPU 16 may determine "color temperature" of light source, where color temperature refers to the relative warmth or coolness of the white color. In some cases, captured images may have an unrealistic color cast. In some examples, auto white balance algorithm analyzes the ratio between red, green and blue components and applies heuristics that output suggested Red and Blue gain levels. When the R, B channels are multiplied by those multipliers, the image will look more balanced: gray regions will look gray and will not have unnatural color cast. However, in case of multi-illumination scenes (e.g., where there is shadows), determining the multipliers may be more challenging since different multipliers are ideal for different regions.

In one or more examples, camera processor 14 may store respective camera parameters (e.g., 3 A camera parameters) for each of cameras 12A-12C. Cameras 12A-12C may utilize AF parameters for adjusting focal length and AEC parameters causing cameras 12A-12C to operate according to a shutter and aperture size. Camera processor may utilize the AWB as part of processing the frame. In some examples, each of cameras 12A-12C may capture frames in accordance with their respective camera parameters. However, camera processor 14 may process the frames from only one of cameras 12A-12C and the remaining frames may be "flushed" (e.g., not processed or stored for display). As described below, in some examples, there may be times when the frames from two different cameras 12A-12C are processed, but in general, frames from only one of cameras 12A-12C are processed by camera processor 14.

In some examples, camera processor 14 may be configured as an image processing pipeline. For instance, camera processor 14 may include a camera interface that interfaces between camera 12 and camera processor 14. Camera processor 14 may include additional circuitry to process the image content.

In some examples, camera processor 14 may be configured to perform digital zoom in or digital zoom out. Although described with respect to camera processor 14 performing digital zoom in or digital zoom out, in some examples, cameras 12A-12C may be configured to perform digital zoom in or digital zoom out. For instance, cameras 12A-12C may each include processing circuitry to perform the digital zoom in or zoom out.

To zoom in, camera processor 14 may perform cropping and resizing of frames received from one of cameras 12A-12C. As an example, in response to receiving a request to zoom in from 1× to 2×, camera processor 14 may crop out 50% of the perimeter of a frame received from camera 12B, and resize the cropped frame. In this example, the center 50% of frame is now resized to the full size of the frame, and the image content appears to be twice as large.

To avoid sudden jumps in zooming, when zooming from one zoom threshold to another (e.g., 1× to 2×), camera processor 14 and/or cameras 12A-12C may gradually increase or decrease the zoom factor. For example, if the zoom factor were suddenly changed from 1× to 2×, the viewer experience may be undesirable. Therefore, the zoom factor may slowly change. As one example, the zoom factor (e.g., by camera processor 14 and/or cameras 12A-12C) may increase or decrease linearly, so that the zoom factor is 1×, then 1.1×, then 1.2×, and so forth until 2×, as one example. Linear increase or decrease of zoom factor and a step-size of 0.1× are both provided as one example, and should not be considered limiting. Also, as described above, there may be at least two ways in which the zoom factor changes, and the two ways may be used individually or together: (1) based on digital zoom where camera processor 14 crops and resizes and (2) based on optical zoom with movement of sensor or lenses of cameras 12A-12C.

To reiterate, a user of camera device 10 may zoom in or zoom out of video content that camera device 10 recording. In response to a request to zoom in or zoom out, camera processor 14 may process frames captured by one of cameras 12A-12C until the zoom factor reaches a zoom threshold for the one of cameras 12A-12C. Because the zoom factor may gradually change from one zoom threshold to another, there may be certain amount of time that elapses for the zoom factor to reach the zoom threshold. For example, it may take approximately 0.5 seconds to reach the zoom threshold. In some examples, the range of time it takes to reach a zoom threshold is approximately between 0.2 seconds to 0.7 seconds.

Accordingly, camera processor 14 may process frames captured by a first camera of cameras 12A-12C based on the camera parameters for the first camera of cameras 12A-12C. In response to a request to zoom in or zoom out, camera processor 14 may process frames captured by the first camera during the zoom in or zoom out to a zoom threshold for the first camera of cameras 12A-12C. For example, during the zoom in or zoom out to a zoom threshold for the first camera (e.g., the 0.5 seconds), the first camera captures frames based on the camera parameters that were originally determined. For example, the zoom factor for the first camera of cameras 12A-12C may originally be at 1×, and the camera parameters (e.g., 3 A parameters of AF, AWB, and AEC) may have been determined when the zoom factor for the first camera is 1×. The zoom factor for a second camera of cameras 12A-12C may originally be at 2×, and the camera parameters (e.g., 3 A parameters) may have been determined when the zoom factor for the second camera is 2×.

Then, during the time the zoom factor changes from 1× to the zoom threshold of 2× (e.g., the 0.5 seconds), the first camera may keep capturing frames based on the camera parameters determined with zoom factor of 1×. That is, although the zoom factor may be changing (e.g., 1.1×, 1.2×, 1.3×, and so forth to 2×), the first camera may capture frames based on the camera parameters determined with zoom factor of 1×. After reaching the zoom factor of 2×, camera processor 14 may start processing frames captured by the second camera of cameras 12A-12C using the camera parameters for the second camera of cameras 12A-12C determined based on the 2× zoom factor for the second camera of cameras 12A-12C.

In the above example, during the time the zoom factor changes from 1× to the zoom threshold of 2× (e.g., the 0.5 seconds), the first camera may keep capturing frames based on the camera parameters determined with zoom factor of 1×. In general, the camera parameters for each of cameras 12A-12C may be determined based on each of cameras 12A-12C being at a respective first zoom threshold. During the time the zoom factor changes from a first zoom threshold to a second zoom threshold for each of cameras 12A-12C, each of cameras 12A-12C may keep capturing frames based on the camera parameters determined at the first threshold.

In some examples, during the time when the zoom factor is changing from the first zoom threshold to the second zoom threshold, the quality of the captured frames may be lower than the quality of the captured frames when the zoom factor is not changing. For instance, because the camera parameters for a first camera of cameras 12A-12C are based on a first zoom threshold for the first camera, the camera parameters may not be precisely accurate for the first camera if the zoom factor is not the first zoom threshold. As an example, the camera parameters for the first camera may be set based on zoom factor of 1×. The camera parameters may not be accurate for zoom factor of 1.2×. Therefore, frames captured at zoom factor of 1.2× with camera parameters determined for zoom factor of 1× may be of lower quality as compared to frames captured at zoom factor of 1×.

As an example, whenever there is zoom, until the zoom ends (e.g., until the zoom threshold is reached), the field of view (FOV) may be stable. The camera parameters during the zoom are not reset or recalculated, although the FOV may change from the zooming in or zooming out. Accordingly, while zooming, the camera parameters used for capture and processing are the same parameter as were already set before zooming starts. This results in zooming FOV not having precise camera parameters. For example, if the focus object (e.g., AF) lies anywhere other than the center FOV, zooming will result in off focus preview because focused object is no longer in FOV. The same applies for exposure (e.g., AEC) and white-balance (AWB). For instance, if the zoom is from a well-lit scene into a shadow, the zooming FOV will remain poorly lit as it uses per-zoom exposure parameters (i.e., pre-zoom AEC). Therefore, during zooming in or zooming out, the images that are captured tend to have poorer quality than when not zooming in or zooming out.

Although the quality of the frames captured during the time when the zoom factor is changing from the first zoom threshold to the second zoom threshold may be relatively low, in most instances, this relatively low quality of frames does not impact viewer experience. For example, each of cameras 12A-12C may be configured to capture frames at a particular frame rate (e.g., capture rate 30 frames per seconds (fps)). In some cases, camera device 10 displays the frames at a display rate that is same as capture rate (e.g., display rate is 30 fps and capture rate is 30 fps).

As described above, it may take 0.5 seconds to zoom from one zoom threshold to another. Therefore, during this 0.5 seconds, there may be approximately 15 frames that are captured with relatively low quality, assuming capture rate of 30 fps (e.g., 30 fps*0.5 seconds=15 frames). If the display rate is also 30 fps, then it will take 0.5 seconds to display these frames with relatively low quality. The viewer may not perceive or may not be impacted by 0.5 seconds worth of poor-quality frames being displayed.

However, in certain cases, having poor-quality frames may impact viewer experience. As one example, the user may configure camera device 10 to capture frames for slow motion. In slow motion, the capture rate of frames is greater than the display rate of frames. Therefore, it takes more time to display the frames than the amount of time it took to capture the frames. This results in the viewer perceiving slow motion since the image content appears to be moving slower.

As an example, assume that the capture rate is 240 fps and the display rate is 30 fps. In this example, one second of video capture results in 240 frames. With a display rate of 30 fps, it will take 8 seconds (e.g., 240 frames/30 fps) to display the one second of video. In this example, from the viewer's perspective, the objects in the captured frames would appear to move at $\frac{1}{8}^{th}$ the rate that the objects are moving in real-life, hence creating the perception of slow motion.

In some examples, the user of camera device 10 may start video capture in normal mode. Then, the user may cause camera device 10 to start capturing in slow motion. After a while, the user may cause camera device 10 to revert back to capturing in normal mode. For example, during normal mode, cameras 12A-12C may capture frames at 30 fps. During slow motion mode, cameras 12A-12C may capture frames at 120 fps or greater.

For better visual experience, during the slow motion, the user may zoom in or zoom out. For instance, the first camera of cameras 12A-12C may be set for a zoom factor of 0.5×, where the zoom thresholds for the first camera is 0.5× to 1×. Initially, the first camera may capture at 30 fps with 0.5×. Then, the user may cause camera device 10 to capture in slow motion mode. In this example, CPU 16 and/or camera processor 14 may cause the first camera to capture at 240 fps. While the first camera is capturing frames, the user may zoom in, so that the zoom factor increases from 0.5× to 1× (e.g., over approximately 0.5 seconds). Then, camera processor 14 may start to process frames captured by a second camera of cameras 12A-12C, having a zoom factor range of 1× to 2×. Because slow motion is still enabled, CPU 16 and/or camera processor 14 may cause the second camera to capture at 240 fps with zoom factor of 1×. At some point later, the user may cause camera device 10 to exit slow motion, and camera processor 14 may process frames captured by the second camera at 30 fps.

In this way, there is handoff and switching between the first camera and second camera to allow slow motion video capture with zooming in or zooming out. For instance, camera processor 14 processes frames from a first camera of cameras 12A-12C until the zoom threshold for the first camera is reached, and then camera processor 14 processes frames from a second camera of cameras 12A-12C. The capture rate of cameras 12A-12C may be based on whether slow motion is enabled or not (e.g., higher capture rate for slow motion and lower capture rate for normal capture).

However, there may be certain issues with enabling zooming in or zooming out with slow motion. As described above, the frames that are captured during the zooming in or zooming out tend to have poorer quality because the camera parameters are not precise for the zoom factors, but there is low impact because the amount of time it takes to display these frames having the poorer quality is not long (e.g., 0.5 seconds). For zooming in or out with slow motion video capture enabled the amount of time it takes to display these frames having the poorer quality is relatively long.

For example, if the capture rate is 240 fps, then during the 0.5 seconds it takes to go from a first zoom threshold to a second zoom threshold of one of cameras 12A-12C, the number of frames that are captured is 120 frames (e.g., 240 fps*0.5 seconds). If the display rate is 30 fps, then it takes four seconds to display the 120 frames (e.g., 120 frames/30 fps). Therefore, in this example, there would be four seconds where frames having relatively poor quality are displayed. As described above, in normal mode (e.g., not slow motion), there would 0.5 seconds where frames having relatively poor quality are displayed. Accordingly, in slow motion with zooming in or zooming out, where the capture rate is 240 fps, the amount of time that frames having poor quality are displayed can be eight times as long as normal mode with zooming in or zooming out. For higher capture rates, the amount of time that frames having poor quality are displayed can be much larger (e.g. 960 fps results in 16 seconds of poor quality because 960 fps/30 fps*0.5 seconds equals 16 seconds).

This disclosure describes example techniques to enable zooming in or zooming out with slow motion enabled. For example, with slow motion enabled, during the zooming in or zooming out to a zoom threshold of a camera of cameras 12A-12C, camera processor 14 may receive frames at a lower rate than at a rate at which camera processor 14 receives frames with slow motion enabled but without zooming in or zooming out.

As an example, camera processor 14 may receive a first set of frames captured by a first camera of cameras 12A-12C at a first rate with video capture in slow motion enabled (e.g., the first rate is 120 fps or greater). Camera processor 14 may process the first set of frames to generate video content for display. CPU 16 and/or camera processor 14 may receive a selection to zoom in or zoom out. During the zoom in or zoom out to a zoom threshold for the first camera, camera processor 14 may receive a second set of frames captured by the first camera at a second rate that is less than the first rate (e.g., the second rate is 30 fps). Camera processor 14 may process the second set of frames to generate video content for display. For example, camera processor 14 may generate video content for playback, at a third rate (e.g., 30 fps) that is less than the first rate, that includes the first set of frames and the second set of frames. As an example, camera processor 14 generating video content for playback may refer to examples where camera processor 14 provides the first set of frames and the second set of frames so that display interface 26 can output for display.

In this example, display interface 26 may output, for display, generated video content that includes the first set of frames and the second set of frames at a third rate that is less than the first rate (e.g., the third rate is 30 fps). In some examples, display interface 26 may be configured to generate the video content for playback. For example, to generate the video content for playback, display interface 26 may receive the first set of frames and the second set of frames and output the first set of frames, and then output the second set of frames in a manner that causes the viewer to perceive video playback of the frames. In general, camera processor 14, display interface 26, or some other component generating video content for playback may refer to camera processor 14, display interface 26, or some other component arranging, receiving, or processing the sets of frames (e.g., first and second sets of frames) in a manner so that the sets of frames can be output for display.

In an illustrative example, in normal mode, camera processor 14 may receive frames at a rate of 30 fps from camera 12A that is currently at zoom factor of 0.5×. Accordingly, camera 12A is configured to capture frames at 30 fps. In this example, assume that camera 12A captured 8 seconds of frames with capture rate of 30 fps, and therefore, captured 240 frames.

Then, the user may enable slow motion. With slow motion enabled, camera processor 14 may receive frames at a rate of 120 fps from camera 12A that is currently at zoom factor of 0.5×. In this example, camera 12A is configured to capture frames at 120 fps because of slow motion being enabled. Assume that camera 12A captured 4 seconds of frames with capture rate of 120 fps, and therefore, captured 480 frames.

The user may then enable zoom in (or there may be automatic zoom such as with object or face tracking), so that the zoom factor changes from 0.5× to 1× (e.g., the zoom threshold for camera 12A). During the 0.5 seconds it takes to go from a zoom factor of 0.5× to 1× (e.g., due to change in lens/sensor position or progressive zoom), rather than capturing frames at 120 fps, camera 12A may capture frames at 30 fps to reduce the number of frames having lower quality that are captured during the time it takes to go from a zoom factor of 0.5× to 1×, and camera processor 14 may receive frames at 30 fps. As described above, the frames captured for the 0.5 seconds for the zoom factor to reach the zoom threshold tend to have lower quality. Therefore, there will be 15 frames having lower quality.

After reaching the zoom factor of 1×, camera processor 14 may receive frames from camera 12B. Because slow motion is still enabled and there is no more zooming in, camera processor 14 may receive frames from camera 12B at rate of 120 fps. Assume there is 4 seconds of frames with capture rate of 120 fps, and therefore, camera 12B captured 480 frames.

Then assume that the user turns off slow motion. Assume that there is another 10 seconds of frames captured by camera 12B at 30 fps, resulting in 300 frames.

In this example, if the display rate is 30 fps, then the amount of time it would take to display the frames is as follows. Initially there was 8 seconds with capture rate of 30 fps, resulting in 240 frames. It would take 8 seconds at 30 fps to display the 240 frames. Then, there was 4 seconds of frames with capture rate of 120 fps, resulting in 480 frames. It would take 16 seconds at 30 fps to display the 480 frames.

Then zooming in was enabled, where 0.5 seconds of frames were captured with 30 fps, resulting in 15 frames. It would take 0.5 seconds at 30 fps to display the 15 frames. As described above, the quality of these 15 frames may be relatively poor due to the imprecision in the camera parameters during the zooming in. By reducing the capture rate to 30 fps, there is only 0.5 seconds worth of time when the poor-quality frames are displayed, as compared to 2 seconds if the capture rate were kept at 120 fps.

Then, there was another 4 seconds of frames captured at 120 fps, resulting in 480 frames. It would take 16 seconds to display the 480 frames at 30 fps. Slow motion was then turned off with 10 seconds of frames captured at 30 fps, resulting in 300 frames. It would take 10 seconds to display the 300 frames at 30 fps.

In the above example, each one of cameras 12A-12C is configured to capture frames at 120 fps during slow motion or 30 fps during normal video. However, in some examples, the capture rate for two or more of cameras 12A-12C may be different. As one example, during slow motion, camera 12A may capture at 960 fps, camera 12B may capture at 480 fps, and camera 12C may capture at 120 fps. The capture rate for each of cameras 12A-12C may be a user configurable option.

Camera processor 14 may perform some initial image processing on the plurality of frames, but such initial image processing is not necessary in all examples. Camera processor 14 may output the plurality of frames to system memory 30 for storage. In some examples, rather than or in addition to, outputting the plurality of frames to system memory 30, camera processor 14 may output the plurality of frames to local memory 20. As another example, camera processor 14 may store each of the plurality of frames, as each frame is captured, into local memory 20 for temporary storage and then move the plurality of frames from local memory 20 to system memory 30.

Figure 2:
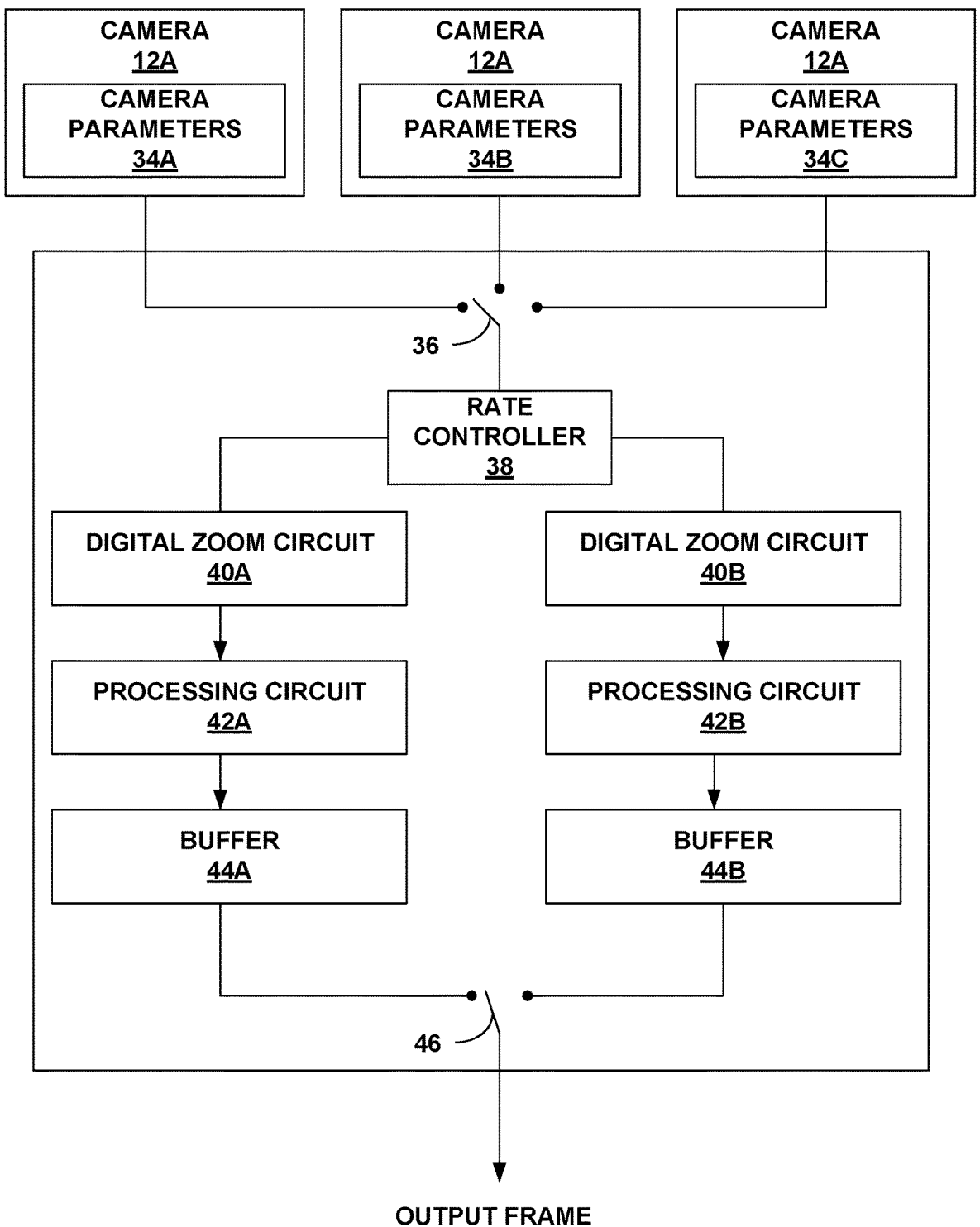
FIG. 2 is a block diagram illustrating a camera processor of the device of FIG. 1 in further detail.

FIG. 2 is a block diagram illustrating a camera processor of the device of FIG. 1 in further detail. As illustrated, cameras 12A-12C may each capture frames that are output to camera processor 14. As described above, each of cameras 12A-12C may be associated with different viewing angles and different ranges for the zoom factor between respective zoom thresholds. In this way, there are parallel streams that are output camera processor 14.

In one or more examples, prior to frame capture or possibly a first few captured frames, are utilized to determine the camera parameters. For instance, camera processor 14 and/or CPU 16 may determine of automatic focus (AF), auto white balance (AWB, and automatic exposure control (AEC) parameters, referred to as 3 A parameters for each of cameras 12A-12C. As illustrated, camera parameters 34A may be the camera parameters for camera 12A, camera parameters 34B may be the camera parameters for camera 12B, and 3 A parameters 3 A may be the camera parameters for camera 12C. For ease of illustration, camera parameters 34A-34C are stored locally on cameras 12A-12C, respectively. However, camera parameters 34A-34C may be stored elsewhere, such as in local memory 20 and/or system memory 30, as two examples.

In some examples, once camera parameters 34A-34C are determined, camera parameters 34A-34C are likely to remain stable for the rest of the recording. In some examples, camera parameters 34A-34C may not be recalculated because such recalculation can take time resulting in delays or poor quality. Camera processor 14 and/or CPU 16 may determine camera parameters 34A-34C individually (e.g., different parameters for each), or camera processor 14 and/or CPU 16 may determine one of camera parameters 34A-34C and apply the determined one to the others of camera parameters 34A-34C (e.g., same values of defocus length, luma index, and color temperatures for camera parameters 34A-34C).

However, in some examples, it may be possible to recalculate camera parameters 34A-34C for cameras 12A-12C whose frames are not being processed. For example, if frames from camera 12A are being processed, frames captured by cameras 12B and 12C may be utilized to update camera parameters 34B and 34C, respectively. With such calculations, it may be possible to compensate for field of view (FOV) changes when switching between cameras 12A-12C.

In FIG. 2, camera processor 14 includes switch 36 that is configured to selectively select the stream from one of cameras 12A-12C. In some cases, as explained below, switch 36 may be configured to select two of the three streams. However, generally, switch 36 may select one of the stream of cameras 12A-12C. The unselected streams may be bypassed from all processing and directly into sink/flush.

As illustrated, camera processor 14 includes rate controller 38. Rate controller 38 may be configured to select a rate at which circuitry of camera processor 14 receives frames. As one example, rate controller 38 may be configured to set the capture rate at which cameras 12A-12C capture frames. For instance, rate controller 38 may cause cameras 12A-12C to capture frames at 30 fps, 120 fps, 240 fps, 960 fps, etc. In such examples, the sensors of cameras 12A-12C may sense light and output currents indicative of the light and color based on the capture rate (e.g., 30 times a second for 30 fps). Rate controller 38 may set the rate of cameras 12A-12C to be the same or be different.

There may be other ways in which rate controller 38 may select the rate at which circuitry of camera processor 14 receives frames. For instance, cameras 12A-12C may each capture frames at a relatively high rate (e.g., 960 fps), and rate controller 38 may be configured to drop frames to achieve the desired rate. For instance, rate controller may drop every frame expect every 8$^{th}$ frame, resulting in an effective rate of 120 fps (e.g., 960 fps/8=120 fps).

In this disclosure, camera processor 14 receiving frames at a particular capture rate refers to examples where the capture rate of cameras 12A-12C is set to the particular rate, and examples where frames captured by cameras 12A-12C are dropped to effectively achieve the particular capture rate. There may be other ways in which camera processor 14 may receive frames at a particular rate (e.g., capture rate) and the techniques described in this disclosure are not limited to any set technique.

Camera processor 14 includes digital zoom circuit 40A, processing circuit 42A, and buffer 44A. Camera processor 14 may optionally include digital zoom circuit 40B, processing circuit 42B, and buffer 44B. Example uses of digital zoom circuit 40B, processing circuit 42B, and buffer 44B are described in more detail below. For ease of understanding, the example techniques are described with respect to digital zoom circuit 40A, processing circuit 42A, and buffer 44A.

Digital zoom circuit 40A or 40B may be part of cameras 12A-12C rather than or in addition to being part of camera processor 14. Also, digital zoom circuit 40A and/or 40B may not be necessary in all examples. For instance, in some examples, optical zoom may be sufficient. In some examples, zooming in or zooming out may be based on both optical zoom and digital zoom provided by digital zoom circuit 40A and/or 40B. To implement optical zoom, camera processor 14 may include circuitry that sets the location of the sensor and/or lens of cameras 12A-12C to achieve the desired zoom factor.

Digital zoom circuit 40A receives the frames from the selected one of cameras 12A-12C, and if zoom is not enabled may pass the frames to processing circuit 42A. Processing circuit 42A may be configured to perform any processing, such as filtering or any other processing needed to prepare the output frame to be output. Examples of processing include spatial filtering (e.g., filtering across image content in the same frame) or edge enhancement, as a few examples. Buffer 44A may be configured to store the frames until the frames are output to system memory 30. Display interface 26 may then output, for display, the frames. Accordingly, camera processor 14, buffer 44A, and display interface 26 may be considered as generating video content for playback that includes the frames that are then outputted for display.

In one or more examples, as part of capturing video content, the user may enable slow motion mode (e.g., video capture with slow motion enabled). Processing circuit 42A may receive a first set of frames captured by a first camera 12A at a first rate. The first rate may be set by rate controller 38, and may be relatively high (e.g., at least 120 fps or greater). Processing circuit 42A may process the first set of frames to generate video content for display (e.g., store in frames in buffer 44A). First camera 12A may capture the first set of frames based on camera parameters 34A.

CPU 16 may receive a selection to zoom in or zoom out. For example, the user may utilize display 28 to provide an input to indicate that the user desires to zoom in or zoom out of the image content that is being captured. CPU 16 may then output information indicating the selection to zoom in or zoom out to camera processor 14 and/or cameras 12A-12C.

In response to the selection to zoom in or zoom out, camera processor 14 may enable performance of zooming in or zooming out. For example, since camera processor 14 was receiving frames from first camera 12A, camera processor 14 may cause the position of the lens and/or sensor of camera 12A to move to change the focus and provide the zooming in or zooming out. As another example, digital zoom circuit 40A may perform digital zoom on the frames captured by camera 12A.

During the zoom in or zoom out to a zoom threshold for the first camera 12A, processing circuit 42A may receive a second set of frames captured by the first camera 12A at a second rate that is less than the first rate. For example, rate controller 38 may cause first camera 12A to capture frames at the second rate (e.g., 30 fps). As another example, rate controller 38 may drop frames from first camera 12A to achieve the effective second rate.

Because the second set of frames are captured during the zoom in or zoom out, and camera parameters 34A are determined without zooming in or zooming out, an image quality of the second set of frames is poorer than an image quality of the first set of frames. By reducing the rate at which the second set of frames are captured (e.g., by setting capture rate or dropping frames to achieve effective capture rate), the number of frames having poorer quality is minimized.

Camera processor 14 may process the second set of frames to generate video content for display. As one example, digital zoom circuit 40A may perform digital zoom in or digital zoom out until the zoom threshold for the first camera 12A is reached (e.g., from 0.5× to 1× zoom factor). For instance, performing digital zoom in or digital zoom out until the zoom threshold for the first camera 12A is reached includes digital zoom circuit 40A performing cropping and resizing during an increase or decrease of a zoom factor on the second set of frames captured.

Buffer 44A may store the first set of frames and the second set of frames. System memory 30 may receive the first set of frames and the second set of frames. Display interface 26 may retrieve the first set of frames and the second set of frames and output, for display on display 28, the first set of frames and the second set of frames at a third rate (e.g., 30 fps) that is less than the first rate. For example, camera processor 14, buffer 44A, and display interface 26, either alone or in combination, may be considered as generating video content for playback, at a third rate (e.g., 30 fps) that is less than the first rate, that includes the first set of frames and the second set of frames.

In the above example, receiving the selection to zoom in or zoom out is received with video capture in slow motion enabled. Also, camera processor 14 may receive the second set of frames with video capture in slow motion enabled.

After the zoom threshold for first camera 12A is reached, camera processor 14 may receive frames from another one of cameras 12. The switching from one camera to another is referred to as a hard switch. For example, switch 36 may switch from first camera 12A to second camera 12B. In this example, camera processor 14 may receive a third set of frames captured by second camera 12B of the plurality of cameras 12 at a fourth rate that is greater than the second rate. As one example, the fourth rate may be 120 fps or greater, and greater than the second rate, which may be 30 fps. Similar to above, rate controller 38 may set the capture rate of second camera 12B or drop frames to achieve the capture rate. Camera processor 14 may process the third frame (e.g., via processing circuit 42A since there may not be zooming) to generate video content for display. Display interface 26 may output, for display on display 28, the third set of frames at the third rate. For example, camera processor 14 and display interface 26 may be considered as generating video content for playback, at the third rate, that includes the first set of frames, the second set of frames, and the third set of frames. In this example, because video capture in slow motion is still enabled the fourth rate at which camera processor 14 receives and processes frames is greater than the display rate of the third rate.

Second camera 12B may capture frames based on camera parameters 34B. For instance, during or prior to first camera 12A capturing the first set of frames, CPU 16 and/or camera processor 14 may determine one or more of AF, AWB, and AEC parameters for each of the plurality of cameras 12A-12C (e.g., determine camera parameters 34A-34C). In such examples, receiving the third set of frames captured by second camera 12B includes receiving the third set of frames based on one or more of AF, AWB, and AEC parameters determined for second camera 12B (e.g., camera parameters 34B) during or prior to the first camera 12A capturing the first set of frames. For instance, as described above, camera parameters 34A-34C may be stable or may not be redetermined during the capturing of the frames. Therefore, although 3 A parameter 34B was determined when or before the first set of frames were captured by camera 12A, camera parameters 34B may still be accurate for camera 12B.

As described above, in some examples, camera processor 14 may optionally include digital zoom circuit 40B, processing circuit 42B, and buffer 44B. One or more of digital zoom circuit 40B, processing circuit 42B, and buffer 44B (e.g., processing circuit 42B may be present but digital zoom circuit 40B is not present). Digital zoom circuit 40B, processing circuit 42B, and buffer 44B may be utilized in examples where there is overlap in the zoom factor ranges for different cameras 12A-12C. For instance, in some examples, the zoom thresholds for camera 12A may be 0.5× and 1×, and the zoom thresholds for camera 12B may be 1× to 2×. However, in some examples, the zoom thresholds for camera 12A may be 0.5× to 1.3×, and the zoom thresholds for camera 12B may be 1× to 2×. In this example, there is an overlap from 1× to 1.3× in the zoom factor ranges for cameras 12A and 12B.

The use of digital zoom circuit 40B, processing circuit 42B, and buffer 44B when there is overlap in the zoom factor ranges is one example and should not be considered limiting. Digital zoom circuit 40B, processing circuit 42B, and buffer 44B may still be utilized even in examples where there is not overlap in zoom factor ranges.

In such examples, in response to a zoom in or zoom out, where processing circuit 42A is processing frames from camera 12A, processing circuit 42A may keep processing frames from camera 12A until the zoom threshold of camera 12A is reached. In parallel, processing circuit 42B may start processing frames from camera 12B. For example, switch 36 may be configured to route the output from camera 12A to processing circuit 42A (e.g., via digital zoom circuit 40A), and route the output from camera 12B to processing circuit 42B (e.g., via digital zoom circuit 40B). Processing circuit 42B may output to buffer 44B.

Camera processor 14 may also include switch 46. Switch 46 may be configured to selectively output from buffer 44A or buffer 44B. In some examples, as the zoom factor for camera 12A pass through 1× towards 1.3×, switch 46 may be configured to output from buffer 44A until the zoom factor reaches 1.3×. In parallel, after the zoom factor passes 1×, processing circuit 42B may be configured to output frames to buffer 44B. In this case, from the zoom factor being 1× to 1.3×, the frames in buffer 44B may be overwritten once buffer 44B is full. However, after the zoom factor reaches 1.3×, switch 46 may switch to select the output from buffer 44B.

Having both buffer 44A and buffer 44B may be beneficial to avoid a gap in frames to display when there is a switch from camera 12A to camera 12B. For instance, there are already frames in buffer 44B that are ready to be displayed. Otherwise, there is a chance that during the switch over from camera 12A to camera 12B, there is a split second where there is a blank frame. By prefiling buffer 44B with frames, there may not be a blank frame.

As described above, with video capture in slow motion enabled, camera processor 14 may be configured to receive a first set of frame captured by first camera 12 at a first rate, and during the zoom in or zoom out to a zoom threshold for the first camera, receive a second set of frames captured by the first camera 12A at a second rate that this less than the first rate. In some examples, in parallel with processing the second set of frames, camera processor 14 may receive a third set of frames captured by a second camera 12B of the plurality of cameras 12A-12C. For instance, during the time that camera 12A is zooming in from 0.5× to 1.3×, camera processor 14 may receive in parallel a third set of frames from camera 12B, such as when the zoom factor is between 1× and 1.3×. Camera processor 14 may process the third set of frames.

Switch 46 may be configured to select buffer 44A so as to output, for display, the second set of frames until a second zoom threshold (e.g., 1.3×) for the first camera 12A is reached. Switch 46 may be configured to then select buffer 44B, so as to output, for display, the third set of frames after the second zoom threshold (e.g., 1.3×) for the first camera 12A is reached. In this way, generating the video content for playback may include generating video content for playback, at the third rate, that includes the first set of frames, the second set of frames until a second zoom threshold for the first camera is reached, and the third set of frames after the second zoom threshold for the first camera is reached. In this example, both the first camera 12A and the second camera 12B are configured to operate at zoom factors greater than or equal to the first zoom threshold and less than or equal to the second zoom threshold. For instance, both camera 12A and camera 12B are configured to operate at zoom factors greater than or equal to 1× and less than or equal to 1.3×.

Figure 3:
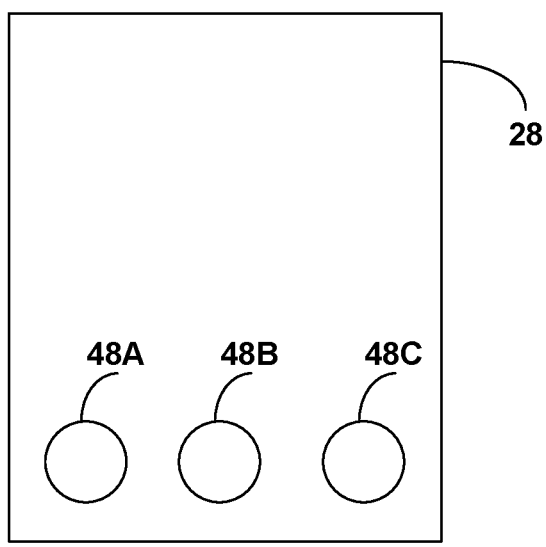
FIG. 3 is a conceptual diagram illustrating an example way to enable zoom in or zoom out.

FIG. 3 is a conceptual diagram illustrating an example way to enable zoom in or zoom out. In the example illustrated in FIG. 3, display 28 may display three icons 48A-48C, each associated with a different zoom threshold for different one of cameras 12A-12C. For example, icon 48A may be associated with 0.5× for camera 12A, icon 48B may be associated with 1× for camera 12B, and icon 48C may be associated with 2× for camera 12C. Accordingly, in some examples, camera processor 14 and/or CPU 16 may receive information indicative of a selection to zoom as a way of receiving a selection to zoom in or zoom out (e.g., such as where video capture in slow motion is enabled).

However, there may be other ways in which to receive a selection to zoom in or zoom out such as by receiving information indicative of a pinch to zoom motion. In the pinch to zoom motion, the user may place two fingers on display 28 and pinch the two fingers together to zoom out or spread the two fingers apart to zoom in.

In both cases (e.g., selection or pinch to zoom), camera processor 14 may cause zoom factor of one of cameras 12A-12C from which camera processor 14 is receiving frames to increase or decrease until a zoom threshold for the one of cameras 12A-12C is reached. During the zooming in or out to the zoom threshold (e.g., the approximately 0.5 seconds it takes for the zoom factor to reach the zoom threshold), camera processor 14 may receive and process frames at a lower rate than the rate at which camera processor 14 may receive and process frames when the user is not zooming in or out.

Figure 4:
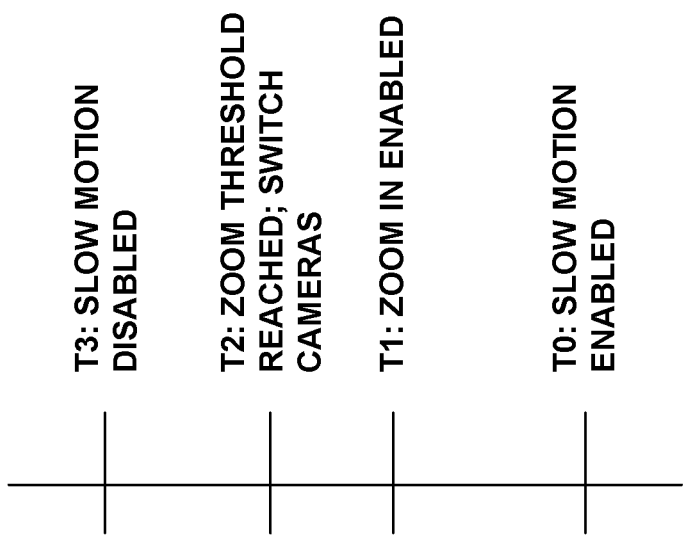
FIG. 4 is a timing diagram illustrating an example of zooming in or zooming out.

FIG. 4 is a timing diagram illustrating an example of zooming in or zooming out. In FIG. 4, prior to time T0, camera processor 14 may be configured to receive frames from camera 12A at 30 fps because zoom is not enabled.

At time T0, the user may enable slow motion (e.g., via an input through display 28). From time T0, camera processor 14 may receive a first set of frames capture by first camera 12A at a first rate. The first rate may be relatively high, such as 120 fps or greater. Processing circuit 42A may be configured to process the first set of frames to generate video content for display. Processing circuit 42A may store the first set of frames in buffer 44A.

At time T1, CPU 16 and/or camera processor 14 may receive a selection to zoom in or zoom out. For example, receiving a selection to zoom in or zoom out may include one of receiving information indicative of a pinch to zoom motion, or receiving information indicative of a selection to zoom (e.g. via selection of one of icons 48A-48C).

From time T1 to T2, the zoom factor for camera 12A may change. For example, it may take approximate 0.5 seconds to zoom from 0.5× to 1×. During this 0.5 seconds, camera processor 14 may receive frames captured by camera 12A. For instance, during the zoom in or zoom out to a zoom threshold for first camera 12A, camera processor 14 may receive a second set of frames captured by first camera 12A at a second rate that is less than the first rate. Because the second set of frames are captured with camera parameters 34A that were selected for a zoom factor of 0.5×, an image quality of the second set of frames may be poorer than an image quality of the first set of frames. As one example, the second rate may be 30 fps.

Processing circuit 42A may process the second set of frames to generate video content for display and store the second set of frames (e.g., after processing) in buffer 44A. Camera processor 14 may cause buffer 44A to output the first set of frames and the second set of frames to system memory 30. Display interface 26 may receive from system memory 30 the first set of frames and the second set of frames and output, for display on display 28, the first set of frames and the second set of frames at a third rate that is less than the first rate (e.g., 30 fps).

At time T2 the zoom threshold for camera 12A is reached, and camera processor 14 processes frames from second camera 12B. For example, switch 36 switches to route the output from second camera 12B to processing circuit 42A (e.g., via digital zoom circuit 40A, if needed). For instance, after the zoom threshold for the first camera 12A is reached, camera processor 14 may be configured to receive a third set of frames captured by a second camera 12B of the plurality of cameras 12A-12C at a fourth rate (e.g., 120 fps or greater) that is greater than the second rate (e.g., the second rate is 30 fps). Processing circuit 42A may process the third set of frames to generate video content for display and store the third set of frames in buffer 44A. Buffer 44A may output the third set of frames to system memory 30. Display interface 26 may retrieve the third set of frames and output for display the third set of frames at the third rate (e.g., 30 fps).

At time T3, the user may disable video capture with slow motion. In this case, camera processor 14 may keep receiving frames from second camera 12B. However, the rate at which camera processor 14 receives the frames from second camera 12B may be relatively low (e.g., 30 fps) because slow motion is disabled. Again, in slow motion, frames are captured at a high rate and displayed at a low rate. When slow motion is disabled, the rate at which the frames are captured may be approximately the same as the rate at which the frames are displayed.

Figure 5:
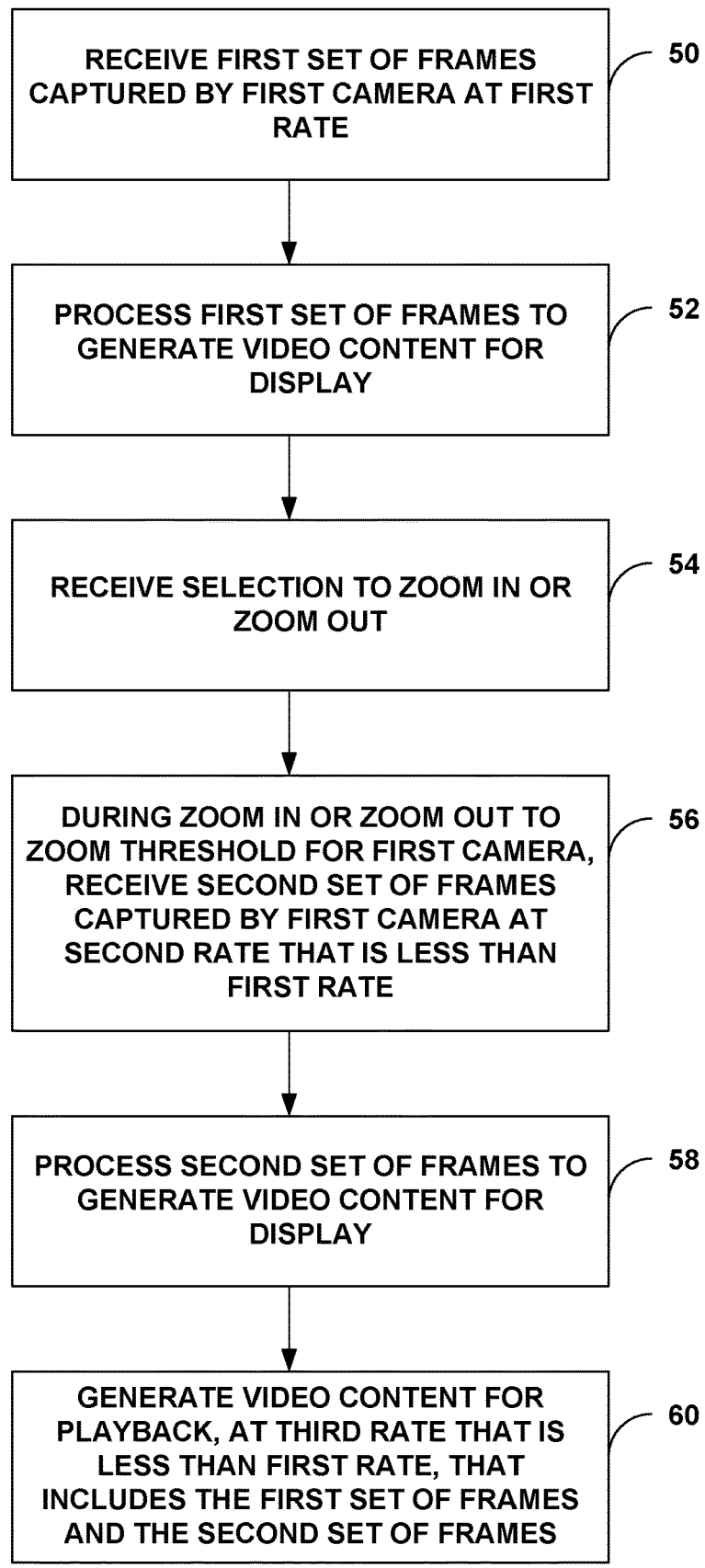
FIG. 5 is a flowchart illustrating an example method of operation in accordance with one or more examples described in this disclosure.

FIG. 5 is a flowchart illustrating an example method of operation in accordance with one or more examples described in this disclosure. The example of FIG. 5 is described with respect to one or more processors, examples of which include one or more of camera processor 14, CPU 16, and display interface 26, and a first camera, examples of which include any one of cameras 12A-12C.

One or more processors may receive a first set of frames captured by the first camera at a first rate (50). For example, video capture in slow motion may be enabled. In such cases, the first rate may be relatively high, such as 120 fps or greater.

The one or more processors may process the first set of frames to generate video for display (52). For instance, processing circuit 42A may be configured process the first set of frames to generate video content and store the resulting first set of frames in buffer 44A.

At some point, the one or more processors may receive a selection to zoom in or zoom out (54). For example, receiving the selection to zoom in or zoom out may include receiving the selection to zoom in or zoom out with video capture in slow motion enabled.

During the zoom in or zoom out to a zoom threshold for the first camera, the one or more processors may receive a second set of frames captured by the first camera at a second rate that is less than the first rate (56). In some examples, receiving the second set of frames includes receiving the second set of frames with video capture in slow motion enabled. As described above, it may take a certain amount of time to increase or decrease the zoom factor for the first camera to reach the zoom threshold for the first camera. During the time that the zoom factor is increasing or decreasing to the zoom threshold, the frames that are captured (e.g., the second set of frames) tend to have poorer image quality because the camera parameters are not accurate for those zoom factors. In some examples, an image quality of the second set of frames is poorer than an image quality of the first set of frames.

One or more processors may process the second set of frames to generate video content for display (58). Processing the second set of frames may include performing digital zoom in or digital zoom out until the zoom threshold for the first camera is reached. For example, performing digital zoom in or digital zoom out until the zoom threshold for the first camera is reached may include performing cropping and resizing during an increase or decrease of a zoom factor on the second set of frames.

Buffer 44A may store the first set of frames and the second set of frames. In some examples, the one or more processors may generate video content for playback, at a third rate that is less than the first rate, that includes the first set of frames and the second set of frames (60). The one or more processors (e.g., display interface 26) may output, for display on display 28, the generated video content that includes the first set of frames and the second set of frames at the third rate that is less than the first rate.

The first camera is one of a plurality of cameras (e.g., one of cameras 12A-12C) coupled to the one or more processors. After the zoom threshold for the first camera is reached, the one or more processors may be configured to receive a third set of frames captured by a second camera of the plurality of cameras at a fourth rate that is greater than the second rate, process the third set of frames to generate video content for display, and output for display the third set of frames at the third rate. For example, the one or more processors may generate video content for playback, at the third rate, that includes the first set of frames, the second set of frames, and the third set of frames, and then output for display the generated video content for playback.

As described above, the plurality of cameras may capture frames based on respective camera parameters. For example, during or prior to the first camera capturing the first set of frames, the one or more processors may be configured to determine one or more of AF, AWB, and AEC parameters (e.g., camera parameters 34A-34C) for each of the plurality of cameras. In such examples, receiving the third set of frames captured by the second camera may include receiving the third set of frames based on one or more of AF, AWB, and AEC parameters determined for the second camera during or prior to the first camera capturing the first set of frames.

In some examples, the zoom threshold is a first zoom threshold. After the first zoom threshold for the first camera is reached, the one or more processors may be configured to in parallel with processing the second set of frames, receive a third set of frames captured by a second camera of the plurality of cameras (e.g., switch 36 routes frames from the first camera to processing circuit 42A and routes frames from the second camera to processing circuit 42B), process the third set of frames (e.g., with processing circuit 42B).

The one or more processors may be configured to generate video content for playback, at the third rate, that includes the first set of frames, the second set of frames until a second zoom threshold for the first camera is reached, and the third set of frames after the second zoom threshold for the first camera is reached. For example, the one or more processors may output, for display, the second set of frames until a second zoom threshold for the first camera is reached, and output, for display, the third set of frames after the second zoom threshold for the first camera is reached. In this example, both the first camera and the second camera are configured to operate at zoom factors greater than or equal to the first zoom threshold and less than or equal to the second zoom threshold.

The following describes some example techniques. The example techniques may be used separately or together in any practical combination.

Clause 1. A device for generating video content, the device comprising a first camera and one or more processors coupled to the first camera and configured to receive a first set of frames captured by the first camera at a first rate, process the first set of frames to generate video content for display, receive a selection to zoom in or zoom out, during the zoom in or zoom out to a zoom threshold for the first camera, receive a second set of frames captured by the first camera at a second rate that is less than the first rate, process the second set of frames to generate video content for display, and generate video content for playback, at a third rate that is less than the first rate, that includes the first set of frames and the second set of frames.

Clause 2. The device of clause 1, wherein receiving the selection to zoom in or zoom out comprises receiving the selection to zoom in or zoom out with video capture in slow motion enabled, and wherein receiving the second set of frames comprises receiving the second set of frames with video capture in slow motion enabled.

Clause 3. The device of any of clauses 1 and 2, wherein the first camera is one of a plurality of cameras coupled to the one or more processors, wherein the device comprises a second camera of the plurality of cameras, wherein, after the zoom threshold for the first camera is reached, the one or more processors are configured to receive a third set of frames captured by the second camera of the plurality of cameras at a fourth rate that is greater than the second rate, and process the third set of frames to generate video content for display, wherein generating video content for playback comprises generating video content for playback, at the third rate, that includes the first set of frames, the second set of frames, and the third set of frames.

Clause 4. The device of clause 3, wherein, during or prior to the first camera capturing the first set of frames, the one or more processors are configured to determine one or more of automatic focus (AF), auto white balance (AWB), and automatic exposure control (AEC) parameters for each of the plurality of cameras, and wherein receiving the third set of frames captured by the second camera comprises receiving the third set of frames based on one or more of AF and AEC parameters determined for the second camera during or prior to the first camera capturing the first set of frames.

Clause 5. The device of any of clauses 1-4, wherein processing the second set of frames comprises performing digital zoom in or digital zoom out until the zoom threshold for the first camera is reached, wherein performing digital zoom in or digital zoom out until the zoom threshold for the first camera is reached comprises performing cropping and resizing during an increase or decrease of a zoom factor on the second set of frames.

Clause 6. The device of any of clauses 1-5, wherein the zoom threshold comprises a first zoom threshold, wherein the first camera is one of a plurality of cameras coupled to the one or more processors, wherein, after the first zoom threshold for the first camera is reached, the one or more processors are configured to in parallel with processing the second set of frames, receive a third set of frames captured by a second camera of the plurality of cameras, and process the third set of frames, wherein generating video content for playback comprises generating video content for playback, at the third rate, that includes the first set of frames, the second set of frames until a second zoom threshold for the first camera is reached, and the third set of frames after the second zoom threshold for the first camera is reached, and wherein both the first camera and the second camera are configured to operate at zoom factors greater than or equal to the first zoom threshold and less than or equal to the second zoom threshold.

Clause 7. The device of any of clauses 1-6, wherein the first rate is greater than or equal to 120 frames per second.

Clause 8. The device of any of clauses 1-7, wherein the third rate is equal to the second rate.

Clause 9. The device of any of clauses 1-8, wherein receiving a selection to zoom in or zoom out comprises one of receiving information indicative of a pinch to zoom motion or receiving information indicative of a selection to zoom.

Clause 10. The device of any of clauses 1-9, wherein an image quality of the second set of frames is poorer than an image quality of the first set of frames.

Clause 11. A method for generating video content, the method comprising receiving, with one or more processors, a first set of frames captured by a first camera at a first rate, processing, with the one or more processors, the first set of frames to generate video content for display, receiving, with the one or more processors, a selection to zoom in or zoom out, during the zoom in or zoom out to a zoom threshold for the first camera, receiving, with the one or more processors, a second set of frames captured by the first camera at a second rate that is less than the first rate, processing, with the one or more processors, the second set of frames to generate video content for display, and generating, with the one or more processors, video content for playback, at a third rate that is less than the first rate, that includes the first set of frames and the second set of frames.

Clause 12. The method of clause 11, wherein receiving the selection to zoom in or zoom out comprises receiving the selection to zoom in or zoom out with video capture in slow motion enabled, and wherein receiving the second set of frames comprises receiving the second set of frames with video capture in slow motion enabled.

Clause 13. The method of any of clauses 11 and 12, wherein the first camera is one of a plurality of cameras coupled to the one or more processors, the method further comprising, after the zoom threshold for the first camera is reached receiving a third set of frames captured by a second camera of the plurality of cameras at a fourth rate that is greater than the second rate, and processing the third set of frames to generate video content for display, wherein generating video content for playback comprises generating video content for playback, at the third rate, that includes the first set of frames, the second set of frames, and the third set of frames.

Clause 14. The method of clause 13, further comprising during or prior to the first camera capturing the first set of frames, determining one or more of automatic focus (AF), auto white balance (AWB), and automatic exposure control (AEC) parameters for each of the plurality of cameras, and wherein receiving the third set of frames captured by the second camera comprises receiving the third set of frames based on one or more of AF and AEC parameters determined for the second camera during or prior to the first camera capturing the first set of frames.

Clause 15. The method of any of clauses 11-14, wherein processing the second set of frames comprises performing digital zoom in or digital zoom out until the zoom threshold for the first camera is reached, wherein performing digital zoom in or digital zoom out until the zoom threshold for the first camera is reached comprises performing cropping and resizing during an increase or decrease of a zoom factor on the second set of frames.

Clause 16. The method of any of clauses 11-15, wherein the zoom threshold comprises a first zoom threshold, wherein the first camera is one of a plurality of cameras coupled to the one or more processors, the method further comprising, after the first zoom threshold for the first camera is reached in parallel with processing the second set of frames, receiving a third set of frames captured by a second camera of the plurality of cameras, and processing the third set of frames, wherein generating video content for playback comprises generating video content for playback, at the third rate, that includes the first set of frames, the second set of frames until a second zoom threshold for the first camera is reached, and the third set of frames after the second zoom threshold for the first camera is reached, and wherein both the first camera and the second camera are configured to operate at zoom factors greater than or equal to the first zoom threshold and less than or equal to the second zoom threshold.

Clause 17. The method of any of clauses 11-16, wherein the first rate is greater than or equal to 120 frames per second.

Clause 18. The method of any of clauses 11-17, wherein the third rate is equal to the second rate.

Clause 19. The method of any of clauses 11-18, wherein receiving a selection to zoom in or zoom out comprises one of receiving information indicative of a pinch to zoom motion or receiving information indicative of a selection to zoom.

Clause 20. The method of any of clauses 11-19, wherein an image quality of the second set of frames is poorer than an image quality of the first set of frames.

Clause 21. A computer-readable storage medium storing instructions thereon that when executed cause one or more processors to receive a first set of frames captured by a first camera at a first rate, process the first set of frames to generate video content for display, receive a selection to zoom in or zoom out, during the zoom in or zoom out to a zoom threshold for the first camera, receive a second set of frames captured by the first camera at a second rate that is less than the first rate, process the second set of frames to generate video content for display, and generate video content for playback, at a third rate that is less than the first rate, that includes the first set of frames and the second set of frames.

Clause 22. The computer-readable storage medium of clause 21, wherein the instructions that cause the one or more processors to receive the selection to zoom in or zoom out comprise instructions that cause the one or more processors to receive the selection to zoom in or zoom out with video capture in slow motion enabled, and wherein the instructions that cause the one or more processors to receive the second set of frames comprise instructions that cause the one or more processors to receive the second set of frames with video capture in slow motion enabled.

Clause 23. The computer-readable storage medium of any of clauses 21 and 22, wherein the first camera is one of a plurality of cameras, the instructions further comprising instructions that cause the one or more processors to, after the zoom threshold for the first camera is reached receive a third set of frames captured by a second camera of the plurality of cameras at a fourth rate that is greater than the second rate, and process the third set of frames to generate video content for display, wherein generating video content for playback comprises generating video content for playback, at the third rate, that includes the first set of frames, the second set of frames, and the third set of frames.

Clause 24. The computer-readable storage medium of clause 23, further comprising instructions that cause the one or more processors to during or prior to the first camera capturing the first set of frames, determine one or more of automatic focus (AF), auto white balance (AWB), and automatic exposure control (AEC) parameters for each of the plurality of cameras, and wherein receiving the third set of frames captured by the second camera comprises receiving the third set of frames based on one or more of AF and AEC parameters determined for the second camera during or prior to the first camera capturing the first set of frames.

Clause 25. The computer-readable storage medium of any of clauses 21-24, wherein the zoom threshold comprises a first zoom threshold, wherein the first camera is one of a plurality of cameras, the instructions further comprising instructions that cause the one or more processors to, after the first zoom threshold for the first camera is reached in parallel with processing the second set of frames, receive a third set of frames captured by a second camera of the plurality of cameras, process the third set of frames, wherein generating video content for playback comprises generating video content for playback, at the third rate, that includes the first set of frames, the second set of frames until a second zoom threshold for the first camera is reached, and the third set of frames after the second zoom threshold for the first camera is reached, and wherein both the first camera and the second camera are configured to operate at zoom factors greater than or equal to the first zoom threshold and less than or equal to the second zoom threshold.

Clause 26. A device for generating video content, the device comprising means for receiving a first set of frames captured by a first camera at a first rate, means for processing the first set of frames to generate video content for display, means for receiving a selection to zoom in or zoom out, means for receiving a second set of frames captured by the first camera at a second rate that is less than the first rate during the zoom in or zoom out to a zoom threshold for the first camera, means for processing the second set of frames to generate video content for display, and means for generating video content for playback, at a third rate that is less than the first rate, that includes the first set of frames and the second set of frames.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media. In this manner, computer-readable media generally may correspond to tangible computer-readable storage media which is non-transitory. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. It should be understood that computer-readable storage media and data storage media do not include carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A device for generating video content, the device comprising:
   a first camera; and
   one or more processors coupled to the first camera and configured to:
      receive a first set of frames captured by the first camera at a first rate;
      process the first set of frames to generate video content for display;
      receive a selection to zoom in or zoom out;
      during the zoom in or zoom out to a zoom threshold for the first camera, receive a second set of frames captured by the first camera at a second rate that is less than the first rate;
      process the second set of frames to generate video content for display; and
      generate video content for playback, at a third rate that is less than the first rate, that includes the first set of frames and the second set of frames.

2. The device of claim 1, wherein receiving the selection to zoom in or zoom out comprises receiving the selection to zoom in or zoom out with video capture in slow motion enabled, and wherein receiving the second set of frames comprises receiving the second set of frames with video capture in slow motion enabled.

3. The device of claim 1, wherein the first camera is one of a plurality of cameras coupled to the one or more processors, wherein the device comprises a second camera of the plurality of cameras, wherein, after the zoom threshold for the first camera is reached, the one or more processors are configured to:
   receive a third set of frames captured by the second camera of the plurality of cameras at a fourth rate that is greater than the second rate; and
   process the third set of frames to generate video content for display,
   wherein generating video content for playback comprises generating video content for playback, at the third rate, that includes the first set of frames, the second set of frames, and the third set of frames.

4. The device of claim 3, wherein, during or prior to the first camera capturing the first set of frames, the one or more processors are configured to determine one or more of automatic focus (AF), auto white balance (AWB), and automatic exposure control (AEC) parameters for each of the plurality of cameras, and wherein receiving the third set of frames captured by the second camera comprises receiving the third set of frames based on one or more of AF and AEC parameters determined for the second camera during or prior to the first camera capturing the first set of frames.

5. The device of claim 1, wherein processing the second set of frames comprises performing digital zoom in or digital zoom out until the zoom threshold for the first camera is reached, wherein performing digital zoom in or digital zoom out until the zoom threshold for the first camera is reached comprises:

performing cropping and resizing during an increase or decrease of a zoom factor on the second set of frames.

6. The device of claim 1, wherein the zoom threshold comprises a first zoom threshold, wherein the first camera is one of a plurality of cameras coupled to the one or more processors, wherein, after the first zoom threshold for the first camera is reached, the one or more processors are configured to:
   in parallel with processing the second set of frames, receive a third set of frames captured by a second camera of the plurality of cameras; and
   process the third set of frames,
   wherein generating video content for playback comprises generating video content for playback, at the third rate, that includes the first set of frames, the second set of frames until a second zoom threshold for the first camera is reached, and the third set of frames after the second zoom threshold for the first camera is reached, and
   wherein both the first camera and the second camera are configured to operate at zoom factors greater than or equal to the first zoom threshold and less than or equal to the second zoom threshold.

7. The device of claim 1, wherein the first rate is greater than or equal to 120 frames per second.

8. The device of claim 1, wherein the third rate is equal to the second rate.

9. The device of claim 1, wherein receiving a selection to zoom in or zoom out comprises one of:
   receiving information indicative of a pinch to zoom motion; or
   receiving information indicative of a selection to zoom.

10. The device of claim 1, wherein an image quality of the second set of frames is poorer than an image quality of the first set of frames.

11. A method for generating video content, the method comprising:
   receiving, with one or more processors, a first set of frames captured by a first camera at a first rate;
   processing, with the one or more processors, the first set of frames to generate video content for display;
   receiving, with the one or more processors, a selection to zoom in or zoom out;
   during the zoom in or zoom out to a zoom threshold for the first camera, receiving, with the one or more processors, a second set of frames captured by the first camera at a second rate that is less than the first rate;
   processing, with the one or more processors, the second set of frames to generate video content for display; and
   generating, with the one or more processors, video content for playback, at a third rate that is less than the first rate, that includes the first set of frames and the second set of frames.

12. The method of claim 11, wherein receiving the selection to zoom in or zoom out comprises receiving the selection to zoom in or zoom out with video capture in slow motion enabled, and wherein receiving the second set of frames comprises receiving the second set of frames with video capture in slow motion enabled.

13. The method of claim 11, wherein the first camera is one of a plurality of cameras coupled to the one or more processors, the method further comprising, after the zoom threshold for the first camera is reached:
   receiving a third set of frames captured by a second camera of the plurality of cameras at a fourth rate that is greater than the second rate; and
   processing the third set of frames to generate video content for display,
   wherein generating video content for playback comprises generating video content for playback, at the third rate, that includes the first set of frames, the second set of frames, and the third set of frames.

14. The method of claim 13, further comprising:
   during or prior to the first camera capturing the first set of frames, determining one or more of automatic focus (AF), auto white balance (AWB), and automatic exposure control (AEC) parameters for each of the plurality of cameras, and wherein receiving the third set of frames captured by the second camera comprises receiving the third set of frames based on one or more of AF and AEC parameters determined for the second camera during or prior to the first camera capturing the first set of frames.

15. The method of claim 11, wherein processing the second set of frames comprises performing digital zoom in or digital zoom out until the zoom threshold for the first camera is reached, wherein performing digital zoom in or digital zoom out until the zoom threshold for the first camera is reached comprises:
   performing cropping and resizing during an increase or decrease of a zoom factor on the second set of frames.

16. The method of claim 11, wherein the zoom threshold comprises a first zoom threshold, wherein the first camera is one of a plurality of cameras coupled to the one or more processors, the method further comprising, after the first zoom threshold for the first camera is reached:
   in parallel with processing the second set of frames, receiving a third set of frames captured by a second camera of the plurality of cameras; and
   processing the third set of frames,
   wherein generating video content for playback comprises generating video content for playback, at the third rate, that includes the first set of frames, the second set of frames until a second zoom threshold for the first camera is reached, and the third set of frames after the second zoom threshold for the first camera is reached, and
   wherein both the first camera and the second camera are configured to operate at zoom factors greater than or equal to the first zoom threshold and less than or equal to the second zoom threshold.

17. The method of claim 11, wherein the first rate is greater than or equal to 120 frames per second.

18. The method of claim 11, wherein the third rate is equal to the second rate.

19. The method of claim 11, wherein receiving a selection to zoom in or zoom out comprises one of:
   receiving information indicative of a pinch to zoom motion; or
   receiving information indicative of a selection to zoom.

20. The method of claim 11, wherein an image quality of the second set of frames is poorer than an image quality of the first set of frames.

21. A non-transitory computer-readable storage medium storing instructions thereon that when executed cause one or more processors to:
   receive a first set of frames captured by a first camera at a first rate;
   process the first set of frames to generate video content for display;
   receive a selection to zoom in or zoom out;

during the zoom in or zoom out to a zoom threshold for the first camera, receive a second set of frames captured by the first camera at a second rate that is less than the first rate;

process the second set of frames to generate video content for display; and generate video content for playback, at a third rate that is less than the first rate, that includes the first set of frames and the second set of frames.

22. The non-transitory computer-readable storage medium of claim 21, wherein the instructions that cause the one or more processors to receive the selection to zoom in or zoom out comprise instructions that cause the one or more processors to receive the selection to zoom in or zoom out with video capture in slow motion enabled, and wherein the instructions that cause the one or more processors to receive the second set of frames comprise instructions that cause the one or more processors to receive the second set of frames with video capture in slow motion enabled.

23. The non-transitory computer-readable storage medium of claim 21, wherein the first camera is one of a plurality of cameras, the instructions further comprising instructions that cause the one or more processors to, after the zoom threshold for the first camera is reached:

receive a third set of frames captured by a second camera of the plurality of cameras at a fourth rate that is greater than the second rate; and process the third set of frames to generate video content for display, wherein generating video content for playback comprises generating video content for playback, at the third rate, that includes the first set of frames, the second set of frames, and the third set of frames.

24. The non-transitory computer-readable storage medium of claim 23, further comprising instructions that cause the one or more processors to:

during or prior to the first camera capturing the first set of frames, determine one or more of automatic focus (AF), auto white balance (AWB), and automatic exposure control (AEC) parameters for each of the plurality of cameras, and wherein receiving the third set of frames captured by the second camera comprises receiving the third set of frames based on one or more of AF and AEC parameters determined for the second camera during or prior to the first camera capturing the first set of frames.

25. The non-transitory computer-readable storage medium of claim 21, wherein the zoom threshold comprises a first zoom threshold, wherein the first camera is one of a plurality of cameras, the instructions further comprising instructions that cause the one or more processors to, after the first zoom threshold for the first camera is reached:

in parallel with processing the second set of frames, receive a third set of frames captured by a second camera of the plurality of cameras;

process the third set of frames, wherein generating video content for playback comprises generating video content for playback, at the third rate, that includes the first set of frames, the second set of frames until a second zoom threshold for the first camera is reached, and the third set of frames after the second zoom threshold for the first camera is reached, and wherein both the first camera and the second camera are configured to operate at zoom factors greater than or equal to the first zoom threshold and less than or equal to the second zoom threshold.

26. A device for generating video content, the device comprising:

means for receiving a first set of frames captured by a first camera at a first rate;

means for processing the first set of frames to generate video content for display;

means for receiving a selection to zoom in or zoom out;

means for receiving a second set of frames captured by the first camera at a second rate that is less than the first rate during the zoom in or zoom out to a zoom threshold for the first camera;

means for processing the second set of frames to generate video content for display; and means for generating video content for playback, at a third rate that is less than the first rate, that includes the first set of frames and the second set of frames.

* * * * *